(12) United States Patent
Lee et al.

(10) Patent No.: US 6,390,534 B1
(45) Date of Patent: May 21, 2002

(54) IMPACT BEAM FOR CAR DOORS

(75) Inventors: Dae Gil Lee, Daejeon-si; Jae Wook Kwon, Seoul; Jung Do Suh, Seoul-si; Chang Seop Lee, Soowon-si; Seong Tae Lim, Daejeon-si, all of (KR)

(73) Assignee: Korea Advanced Institute of Science and Technology, Seoul (KR)

( * ) Notice: Subject to any disclaimer, the term of this patent is extended or adjusted under 35 U.S.C. 154(b) by 0 days.

(21) Appl. No.: 09/853,757

(22) Filed: May 14, 2001

(30) Foreign Application Priority Data

Nov. 8, 2000 (KR) ......................................... 2000-66249

(51) Int. Cl.[7] ................................................. B60J 5/04
(52) U.S. Cl. ...................... 296/146.6; 296/188; 49/502; 52/731.6
(58) Field of Search ........................... 296/146.5, 146.6, 296/188; 49/502, 501; 52/735.1, 731.6

(56) References Cited

U.S. PATENT DOCUMENTS

| 5,255,487 A | * | 10/1993 | Wieting et al. | 296/188 X |
| 5,277,469 A | * | 1/1994 | Klippel | 296/146.6 |
| 5,325,632 A | * | 7/1994 | Djavairian et al. | 296/146.6 X |
| 5,755,484 A | * | 5/1998 | Chou et al. | 296/146.6 |
| 5,785,376 A | * | 7/1998 | Nees et al. | 296/146.6 |
| 6,020,039 A | * | 2/2000 | Cxline et al. | 296/188 |
| 6,082,811 A | * | 7/2000 | Yoshida | 296/188 |
| 6,250,711 B1 | * | 6/2001 | Takahara | 296/189 |
| 6,287,666 B1 | * | 9/2001 | Wycech | 296/146.6 X |

FOREIGN PATENT DOCUMENTS

JP 5-319092 * 12/1993

* cited by examiner

Primary Examiner—Joseph D. Pape
(74) Attorney, Agent, or Firm—Birch, Stewart, Kolasch & Birch, LLP

(57) ABSTRACT

An impact beam for car doors is reinforced at its central portion. In an embodiment, the impact beam consists of a longitudinal beam stepped at two positions to allow its central portion to be thicker than its opposite end portions. In another embodiment, the impact beam consists of a longitudinal base beam body, and a hollow reinforcing beam body having a length shorter than that of the base beam body and a sectional size larger than that of the base beam body, and fitted over a central portion of the base beam body. The impact beam further comprises a beam bracketing structure for fastening the opposite ends of the impact beam on a door panel. This beam bracketing structure consists of two support brackets fixedly mounted to the door panel, and a locking mechanism for locking each end of the beam to an associated one of the two support brackets.

8 Claims, 5 Drawing Sheets

IMPACT BEAM FOR CAR DOORS

BACKGROUND OF THE INVENTION

1. Field of the Invention

The present invention relates to an impact beam mounted in a car door and used for absorbing impact in the case of a collision and, more particularly, to an impact beam for car doors designed to have both an improved bending strength and an improved impact energy absorption capacity.

2. Description of the Prior Art

As well known to those skilled in the art, an impact beam is provided between the inside and outside panels of a car door for absorbing impact in the case of a collision. Conventional impact beams for car doors are made of steel pipes, and so they are undesirably heavy in weight and are somewhat inferior in their impact energy absorption capacity at a low temperature.

In an effort to compensate for such problems of conventional steel impact beams, a fiber reinforced impact beam, made of a fiber reinforced composite material having an improved specific strength (strength/density) and somewhat effectively absorbing impact energy, has been proposed and used.

Impact beams become most highly stressed at their central portions, when they are loaded with unexpected bending force. However, since the impact beams are conventionally designed to have a uniform thickness, they cannot effectively endure such bending force. In order to overcome such a problem, the impact beam may be designed to be increased in its thickness. However, such thick impact beams are problematic in that they undesirably waste material, and increase the production cost in addition to being heavy in weight.

Another problem experienced in the conventional impact beams resides in that the beam bracketing structure for fastening the impact beam to a support bracket of a door panel has been designed with only a consideration of strength while ignoring the impact energy absorption capacity.

SUMMARY OF THE INVENTION

Accordingly, the present invention has been made keeping in mind the above problems occurring in the prior art, and an object of the present invention is to provide an impact beam for car doors, which is reinforced at its central portion, and is improved in beam bracketing structure, thus being finally improved in bending strength and impact energy absorption capacity.

In order to accomplish the above object, the primary embodiment of the present invention provides an impact beam for car doors, comprising: a longitudinal beam stepped at two positions to allow its central portion to be thicker than its opposite end portions.

Another embodiment of this invention provides an impact beam, comprising: a longitudinal base beam body; and a hollow reinforcing beam body having a length shorter than that of the base beam body and a sectional size larger than that of the base beam body, and fitted over the central portion of the base beam body.

A further embodiment of the present invention provides an impact beam for car doors, comprising: a longitudinal beam; two support brackets fixedly mounted to a door panel; a fitting holder fixedly mounted at one end portion of each of the two support brackets to receive each end of the beam therein; and a locking bolt or a locking rivet used for locking the end portion of the beam to the fitting holder.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
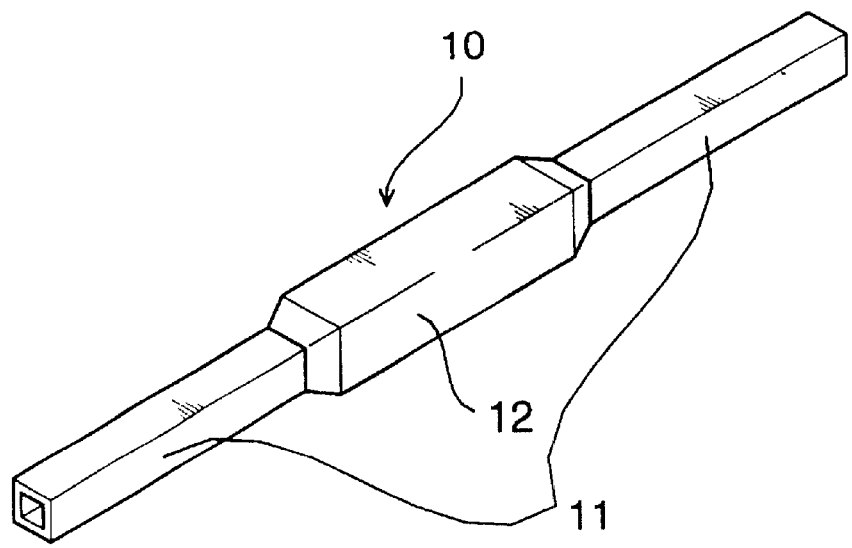
FIG. 1 is a perspective view of an impact beam for car doors in accordance with the primary embodiment of the present invention.

FIG. 1 is a perspective view of an impact beam for car doors in accordance with the primary embodiment of the present invention.

As shown in the drawing, the impact beam according to the primary embodiment of the present invention is a longitudinal beam 10, which is stepped at two positions to allow its central portion 12 to be thicker than its opposite end portions 11.

The impact beam 10 of this invention is made of a fiber reinforced high molecular composite material, which consists of glass fiber, aramid fiber or mixed fiber thereof with an epoxy base or a polyester base.

In the present invention, the impact beam 10 may have a variety of cross-sections, preferably, a hollow square cross-section, and may be preferably lined with a shock absorbing foam layer (not shown) on its internal surface.

Figure 2:
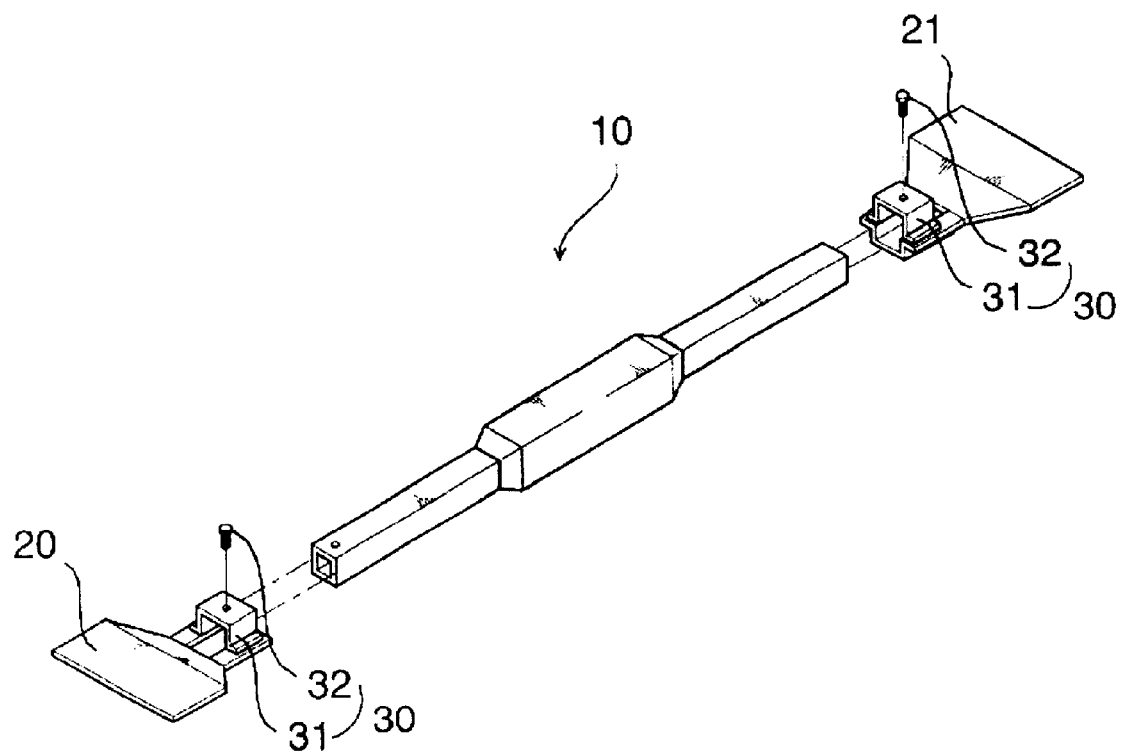
FIG. 2 is an exploded perspective view, showing a beam bracketing structure for fastening opposite ends of the impact beam of FIG. 1 to two support brackets.

FIG. 2 is an exploded perspective view, showing a beam bracketing structure for fastening the opposite ends of the impact beam of FIG. 1 to two support brackets.

As shown in the drawing, the beam bracketing structure for the beam 10 of this invention comprises two support brackets 20 and 21 fixedly mounted to a door panel (not shown), and a locking means 30 for locking each end of the beam 10 to each support bracket 20 or 21.

The above locking means 30 comprises a fitting holder 31 and a locking bolt 32. The fitting holder 31 is fixedly mounted at one end portion of each bracket 20 or 21 while forming a fitting channel therein, and receives each end of the impact beam 10 into the fitting channel. The locking bolt 32 is threaded into a screw hole formed on the top surface of the fitting holder 31, thus locking the position of the end of the beam 10 within the fitting holder 31.

Of course, it should be understood that the locking bolt 32 may be substituted with a locking rivet without affecting the functioning of the present invention.

Figure 3:
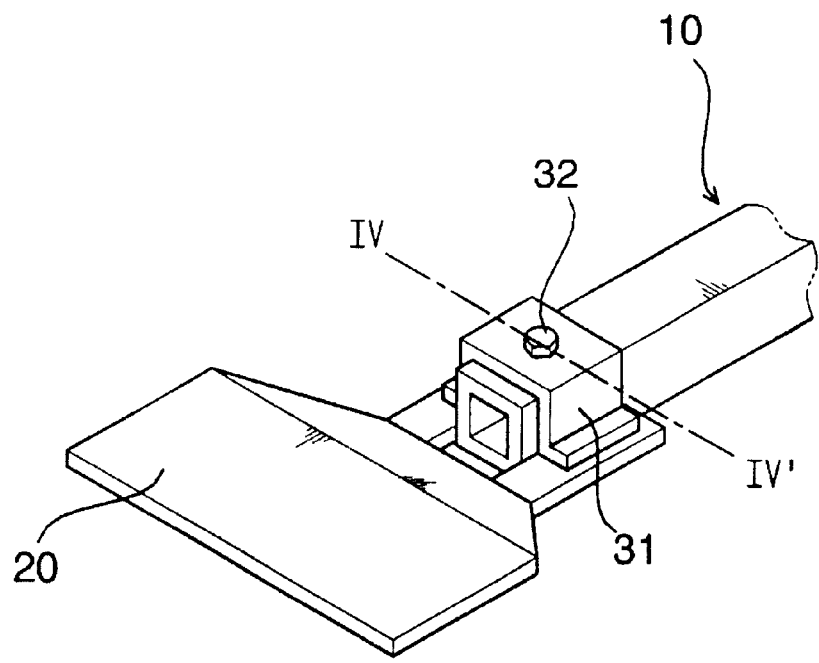
FIG. 3 is a perspective view, showing the construction of the beam bracketing structure of FIG. 2.
Figure 4:
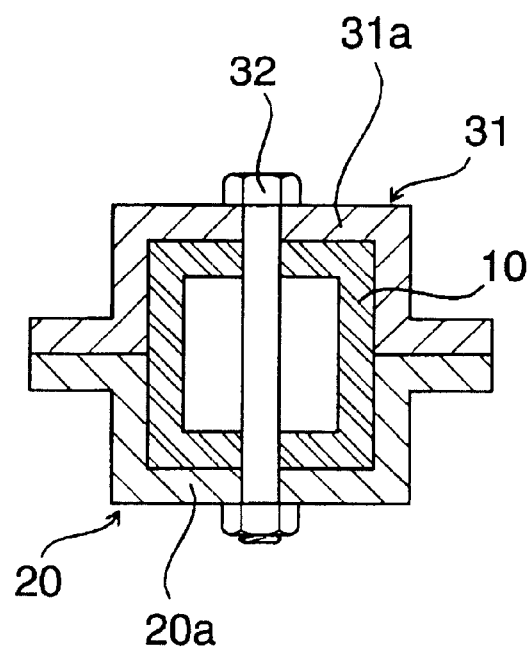
FIG. 4 is a sectional view of the beam bracketing structure taken along the line IV—IV' of FIG. 3.

FIG. 3 is a perspective view, showing the construction of the beam bracketing structure of FIG. 2. FIG. 4 is a sectional view of the beam bracketing structure taken along the line IV—IV' of FIG. 3.

In the present invention, the two beam bracketing structures, provided at the opposite ends of the impact beam 10, have the same construction, and so only one beam bracketing structure having the first bracket 20 is shown in FIGS. 3 and 4 for ease of description. As shown in FIGS. 3 and 4, the end portion of the support bracket 20 is depressed axially and downwardly at its central portion 20a to form a channel along its central axis. On the other hand, the fitting holder 31 is depressed axially and upwardly at its central portion 31a to form another channel along its central axis. The opposite flanges of the bracket 20 and the fitting holder 31 are welded together into a single body with the desired fitting channel.

The locking bolt 32 is vertically threaded into the screw hole of the fitting holder 31, thus fixing the end portion of the impact beam 10 to the bracket 20.

The operational effect of the above-mentioned impact beam will be described herein below.

Figure 5:
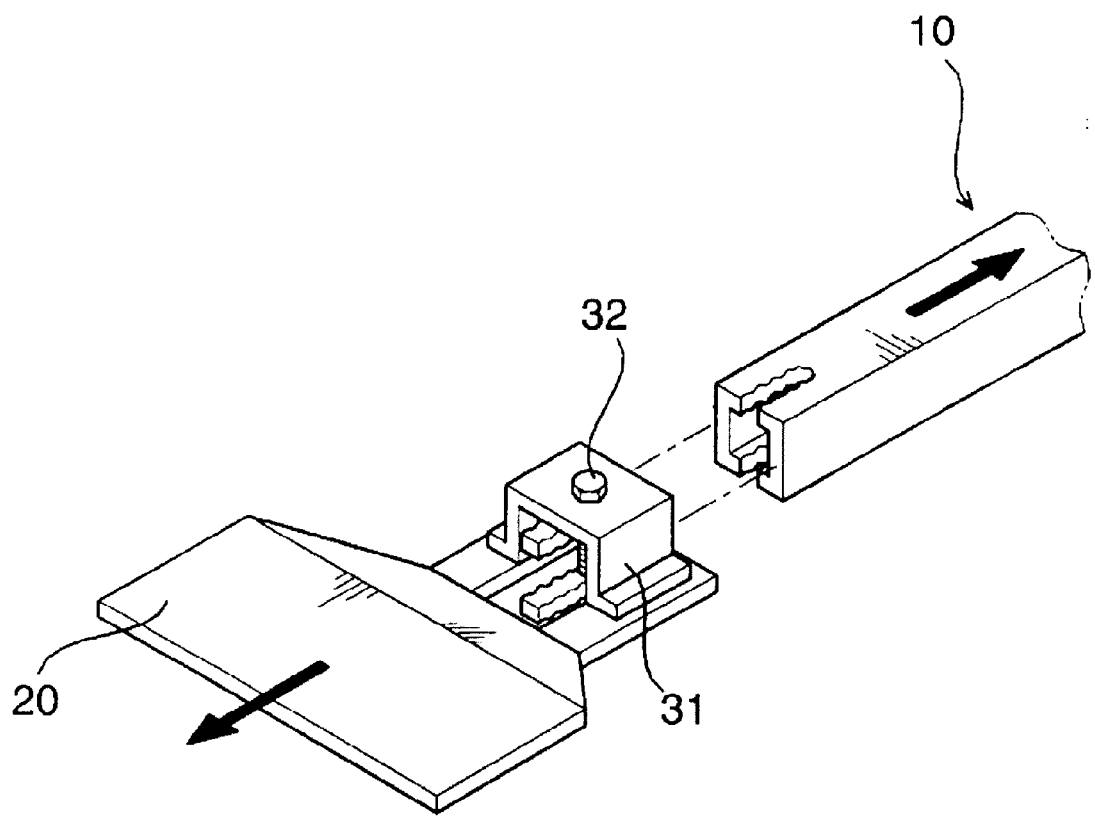
FIG. 5 is an exploded perspective view, showing the beam bracketing structure of FIG. 3, when the structure is unexpectedly broken.

FIG. 5 is an exploded perspective view, showing the beam bracketing structure of FIG. 3, when the structure is unexpectedly broken.

When bending force is applied to the impact beam 10 of this invention, the beam 10 becomes most highly stressed at its central portion 12 in the same manner as that described in the prior art. However, the impact beam 10 of the present invention is designed to have the central portion 12 thicker than the opposite end portions 11, and so the beam 10 effectively endures such bending force applied thereto. The beam bracketing structures for fastening the opposite ends of the beam 10 to the two brackets 20 and 21 are accomplished by the use of the locking screws 32 as described above, and so the impact beam 10 may be excessively stressed at its ends and may be finally shear-fractured as shown in FIG. 5 when the beam 10 is subjected to such bending force in a direction as shown by the arrow of the drawing.

That is, the impact beam 10 of this invention may be shear-fractured by an application of bending force on the beam 10 in such a way that the fracture is in proportion to the amount of absorbed impact energy.

Figure 6A:
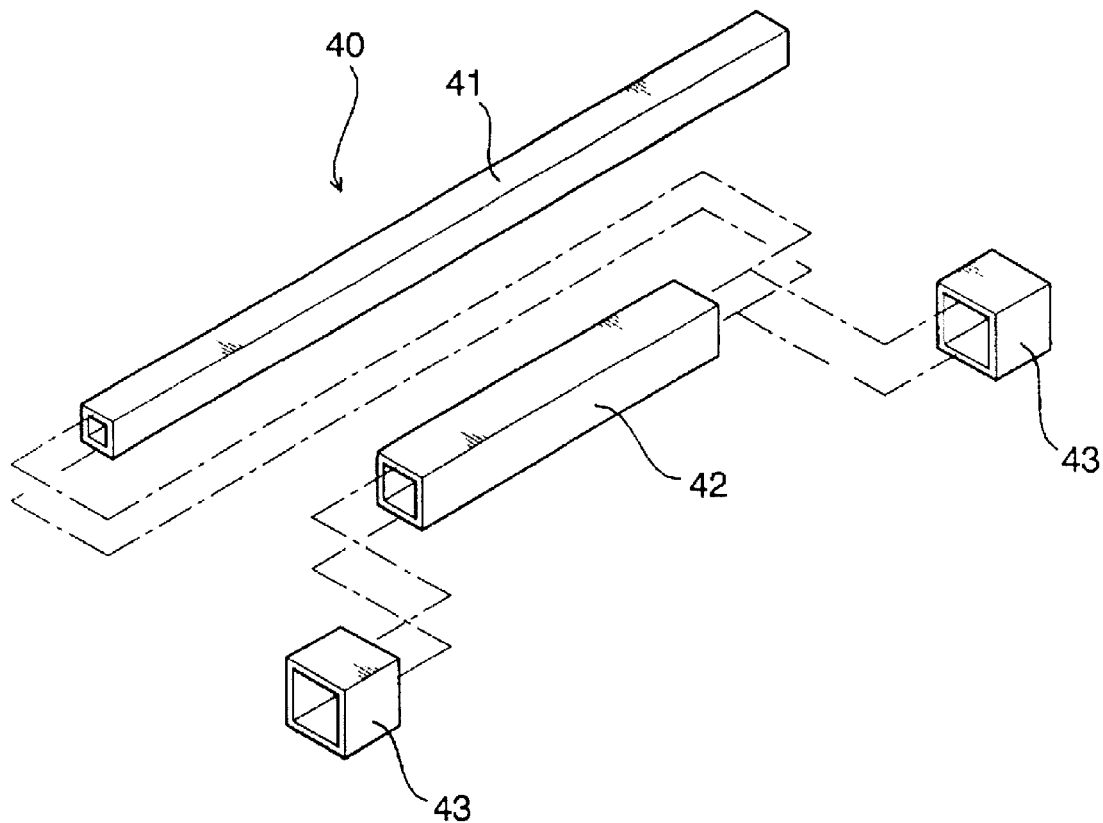
FIG. 6a is an exploded perspective view of an impact beam in accordance with the second embodiment of the present invention.
Figure 6B:
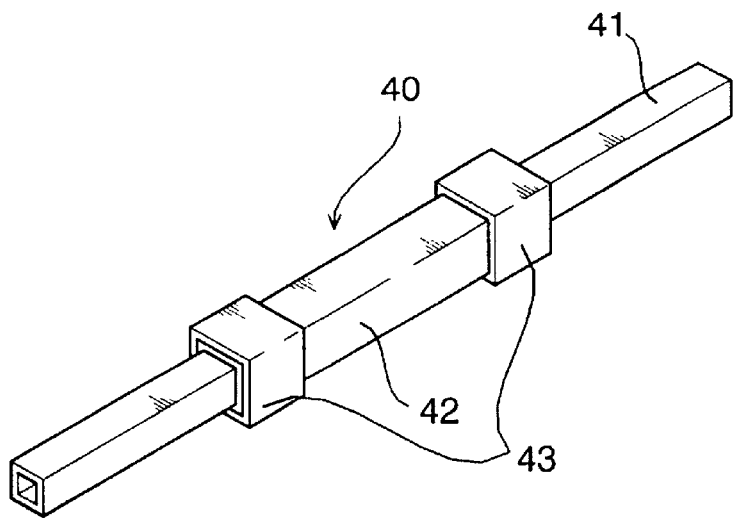
FIG. 6b is a perspective view of the impact beam of FIG. 6a with the elements of the impact beam completely assembled into a single body.

FIG. 6a is an exploded perspective view of an impact beam in accordance with the second embodiment of this invention, and FIG. 6b is a perspective view of the impact beam of FIG. 6a with the elements of the impact beam completely assembled into a single body.

As shown in the drawings, the impact beam 40 according to the second embodiment of the present invention comprises a hollow longitudinal base beam body 41 and a hollow reinforcing beam body 42. The reinforcing beam body 42 has a length shorter than that of the base beam body 41, and has a sectional size larger than that of the base beam body 42, and is fitted over the central portion of the base beam body 41.

Two reinforcing caps 43 are closely fitted over opposite ends of the reinforcing beam body 42, thus fixing the position of the reinforcing beam body 42 on the base beam body 41. In the present invention, it is preferable to make the reinforcing caps 43 using steel, thus effectively reinforcing the ends of the reinforcing beam body 42 and almost completely preventing the ends of the reinforcing beam body 42 from being undesirably shear-fractured in the case of an application of bending force on said beam body 42.

Figure 7:
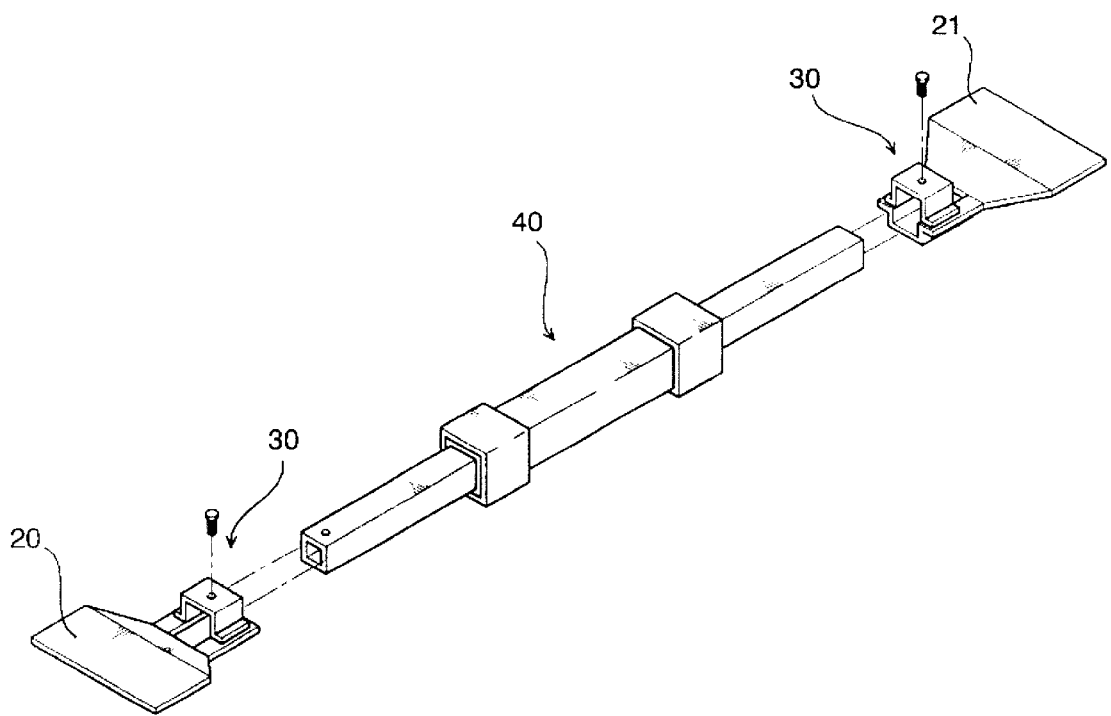
FIG. 7 is an exploded perspective view, showing a beam bracketing structure for fastening opposite ends of the impact beam of FIG. 6a to two support brackets.

FIG. 7 is an exploded perspective view, showing a beam bracketing structure for connecting the opposite ends of the impact beam 40 of FIG. 6a to two support brackets.

In the second embodiment of this invention, the impact beam 40 is held to the two support brackets 20 and 21 using the same locking means 30 as that of the primary embodiment, and further explanation is thus not deemed necessary.

The impact beam 40 becomes most highly stressed at its central portion when it is loaded with unexpected bending force. However, this impact beam 40 is reinforced at its central portion by the reinforcing beam body 42 fitted over the central portion of the base beam body 41. It is thus possible for the impact beam 40 to more effectively endure such bending force.

In addition, the opposite ends of the reinforcing beam body 42 on the base beam body 41 are also reinforced by the two reinforcing caps 43, and so it is possible to almost completely prevent the opposite ends of the reinforcing beam body 42 from being undesirably shear-fractured prior to being conventionally compression-fractured or tension-fractured in the case of an application of bending force on the impact beam 40.

The operational effect provided by the beam bracketing structure of this second embodiment remains the same as that described for the primary embodiment, and further explanation is thus not deemed necessary.

As described above, the present invention provides an impact beam for car doors, which is reinforced at its central portion, and is improved in beam bracketing structure, thus being reduced in its weight due to its high strength and superior design and allowing a car with such impact beams to save fuel. The impact beam of this invention is also improved in bending strength and impact energy absorption capacity, and so it accomplishes desired safety of passengers.

The impact beam and the beam bracketing structure of this invention may be effectively used in designing a variety of load supporting structures or a variety of impact resisting structures in addition to impact beams for car doors. For example, the present invention may be preferably used in the structure of vehicles or the structure of guide rails, which require an improved impact energy absorption capacity.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An impact beam for car doors, comprising:
   a longitudinal beam stepped at two positions to allow its central portion to be thicker than its opposite end portions;
   a beam bracketing structure for fastening the opposite ends of said impact beam on a door panel, said beam bracketing structure comprising two support brackets fixedly mounted to said door panel; and
   locking means for locking each end of said beam to an associated one of the two support brackets.

2. An impact beam for car doors, comprising:
   a longitudinal base beam body; and
   a hollow reinforcing beam body having a length shorter than that of said base beam body and a sectional size larger than that of said base beam body, and fitted over a central portion of the base beam body;
   wherein two reinforcing caps are closely fitted over opposite ends of said reinforcing beam body on the base beam body.

3. The impact beam according to claim 2, wherein said reinforcing caps are made of steel, thus effectively reinforcing the ends of the reinforcing beam body and almost completely preventing the ends of the reinforcing beam body from being shear-fractured in the case of an application of bending force on said reinforcing beam body.

4. The impact beam according to claim 2, further comprising a beam bracketing structure for fastening the opposite ends of said impact beam on a door panel, said beam bracketing structure comprising two support brackets fixedly mounted to said door panel, and locking means for locking each end of said beam to an associated one of the two support brackets.

5. The impact beam according to claim 1 or 4, wherein said locking means comprises:
 a fitting holder fixedly mounted at one end portion of each of said two support brackets to receive each end of said impact beam therein; and
 a locking bolt or a locking rivet used for locking the end portion of said impact beam to the fitting holder.

6. The impact beam according to claim 1 or 2, wherein said impact beam is made of a fiber reinforced high molecular composite material, consisting of glass fiber, aramid fiber or mixed fiber thereof with an epoxy base or a polyester base.

7. The impact beam according to claim 1 or 2, wherein said impact beam is lined with a shock absorbing foam layer on its internal surface.

8. An impact beam for car doors, comprising:
 a longitudinal beam;
 two support brackets fixedly mounted to a door panel;
 a fitting holder fixedly mounted at one end portion of each of said two support brackets to receive each end of said beam therein; and
 a locking bolt or a locking rivet used for locking the end portion of said beam to the fitting holder.

* * * * *

UNITED STATES PATENT AND TRADEMARK OFFICE
CERTIFICATE OF CORRECTION

PATENT NO. : 6,390,534 B1
DATED : May 21, 2002
INVENTOR(S) : Dae Gil Lee et al.

It is certified that error appears in the above-identified patent and that said Letters Patent is hereby corrected as shown below:

Title page,
Item [75], Inventors, should read as follows:
-- Inventors: Dai Gil Lee, Daejeon-si; Jae Wook Kwon, Seoul; Jung Do Suh, Seoul-si; Chang Sup Lee, ASoowon-si; Tae Seong Lim, Daejeon-si, all of (KR) --

Signed and Sealed this

Twenty-eighth Day of June, 2005

JON W. DUDAS
*Director of the United States Patent and Trademark Office*